United States Patent
Harward et al.

(10) Patent No.: US 11,599,508 B1
(45) Date of Patent: Mar. 7, 2023

(54) INTEGRATING DISTRIBUTED FILE SYSTEMS WITH OBJECT STORES

(71) Applicant: Qumulo, Inc., Seattle, WA (US)

(72) Inventors: Christopher Charles Harward, Vancouver (CA); Kevin David Jamieson, North Vancouver (CA); Aleksei Martynov, Seattle, WA (US); Adam Mitha, North Vancouver (CA); Pavel Shilovskiy, Sammamish, WA (US); Sihang Su, Vancouver (CA); Colin Wallace, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/588,895

(22) Filed: Jan. 31, 2022

(51) Int. Cl.
| | | |
|---|---|---|
| *G06F 17/00* | (2019.01) | |
| *G06F 7/00* | (2006.01) | |
| *G06F 16/185* | (2019.01) | |
| *G06F 16/182* | (2019.01) | |

(52) U.S. Cl.
CPC .......... *G06F 16/185* (2019.01); *G06F 16/182* (2019.01)

(58) Field of Classification Search
CPC .............................. G06F 16/185; G06F 16/182
USPC ........................................................ 707/829
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp. 1-46.

(Continued)

*Primary Examiner* — Pavan Mamillapalli
(74) *Attorney, Agent, or Firm* — John W. Branch; Branch Partners PLLC

(57) ABSTRACT

Embodiments are directed to managing data in a file system. A source bucket that contains a plurality of objects on a cloud computing environment may be determined. The source bucket may be associated with a target directory in the file system based on an integration relationship. Object keys from the object store may be provided based on a query and filter rules such that each object key corresponds to an object in the source bucket that conforms to the filter rules. Source objects in the source bucket may be determined based on the object keys such that each source object corresponds to one of the object keys. Target files that correspond to the source objects may be determined based on the integration relationship. In response to determining changed target files or changed source objects, copying the changed source objects or the changed target files to the target directory.

20 Claims, 10 Drawing Sheets

(56) References Cited

U.S. PATENT DOCUMENTS

| | | |
|---|---|---|
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,846,698 B1 | 12/2017 | Panidis et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 11,157,458 B1 | 10/2021 | Carter et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |

(56) References Cited

U.S. PATENT DOCUMENTS

| | | |
|---|---|---|
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1* | 9/2013 | Savage ............... G06F 16/1834 707/723 |
| 2013/0268650 A1* | 10/2013 | Faitelson ............... G06F 16/183 709/224 |
| 2013/0275391 A1* | 10/2013 | Batwara ................. G06F 16/125 707/689 |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1* | 3/2014 | Lovinger ............... G06F 16/182 707/694 |
| 2014/0089649 A1* | 3/2014 | Chaganti ............... G06F 16/182 713/2 |
| 2014/0095249 A1 | 4/2014 | Tarakad et al. |
| 2014/0095505 A1* | 4/2014 | Blanchflower ......... G06F 16/13 707/E17.089 |
| 2014/0095560 A1* | 4/2014 | Ikai ........................... G06F 8/34 707/829 |
| 2014/0095582 A1* | 4/2014 | Eshel .................... G06F 16/183 709/203 |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1* | 7/2015 | Petculescu ............ G06F 16/221 707/823 |
| 2015/0186483 A1* | 7/2015 | Tappan .................... G06F 16/26 707/737 |
| 2015/0186527 A1* | 7/2015 | Rao ....................... G06F 16/185 707/711 |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0110105 A1 | 4/2016 | Karamcheti et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0288057 A1 | 10/2018 | Varadamma et al. |

(56) References Cited

U.S. PATENT DOCUMENTS

| | | |
|---|---|---|
| 2018/0314423 A1 | 11/2018 | Gong et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0286521 A1 | 9/2019 | Okpotse et al. |
| 2019/0286528 A1 | 9/2019 | Wu et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0142878 A1 | 5/2020 | Varadarajan et al. |
| 2020/0174692 A1 | 6/2020 | Dave et al. |
| 2020/0242075 A1 | 7/2020 | Davis et al. |
| 2020/0286270 A1 | 9/2020 | Lymperopoulos et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0191650 A1 | 6/2021 | Vansteenkiste et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0066882 A1 | 3/2022 | Wang et al. |
| 2022/0091739 A1 | 3/2022 | Kumar et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.

(56) References Cited

OTHER PUBLICATIONS

Office Communication for U.S. Appl. No. 15/288,853 dated Sep. 19, 2018, pp. 1-13.
Chimera, Richard, "Value Bars: An information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 23, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Examination Report for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.
Examination Report for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.

(56) References Cited

OTHER PUBLICATIONS

Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30. 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/491,017 dated May 12, 2022, pp. 1-50.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 17/203,452 dated Jun. 22, 2022, pp. 1-22.
Office Communication for U.S. Appl. No. 14/595,598 dated Jul. 13, 2022, pp. 1-9.
Office Communication for U.S. Appl. No. 17/062,500 dated Jul. 26, 2022, pp. 1-20.

(56) References Cited

OTHER PUBLICATIONS

Office Communication for U.S. Appl. No. 17/588,120 dated Jul. 27, 2022, pp. 1-34.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/491,017 dated Aug. 17, 2022, pp. 1-5.
Office Communication for U.S. Appl. No. 17/203,452 dated Sep. 8, 2022, pp. 1-4.
Office Communication for U.S. Appl. No. 17/491,017 dated Sep. 15, 2022, pp. 1-55.
Office Communication for U.S. Appl. No. 17/864,190 dated Sep. 19, 2022, pp. 1-10.
Office Communication for U.S. Appl. No. 17/062,500 dated Oct. 5, 2022, pp. 1-4.
Office Communication for U.S. Appl. No. 17/203,452 dated Oct. 19, 2022, pp. 1-9.
Office Communication for U.S. Appl. No. 17/588,120 dated Oct. 21, 2022, pp. 1-5.

* cited by examiner

INTEGRATING DISTRIBUTED FILE SYSTEMS WITH OBJECT STORES

TECHNICAL FIELD

The present invention relates generally to file systems, and more particularly, but not exclusively, to managing importing objects from object stores into distributed file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be distributed across multiple hosts, storage volumes, networks, or data centers, and so on. Some organizations (for various reasons) may store data as objects in cloud-based object stores. Object stores may enable less expensive long-term storage. Or, in some cases, certain applications used by organization may generate data objects that are stored in object stores. Often object stores behave differently than file systems. Also, in some cases, clients of a distributed file system may require access to data that is stored in an object store or such clients may require file system semantics that are not offered by a cloud-based object store. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
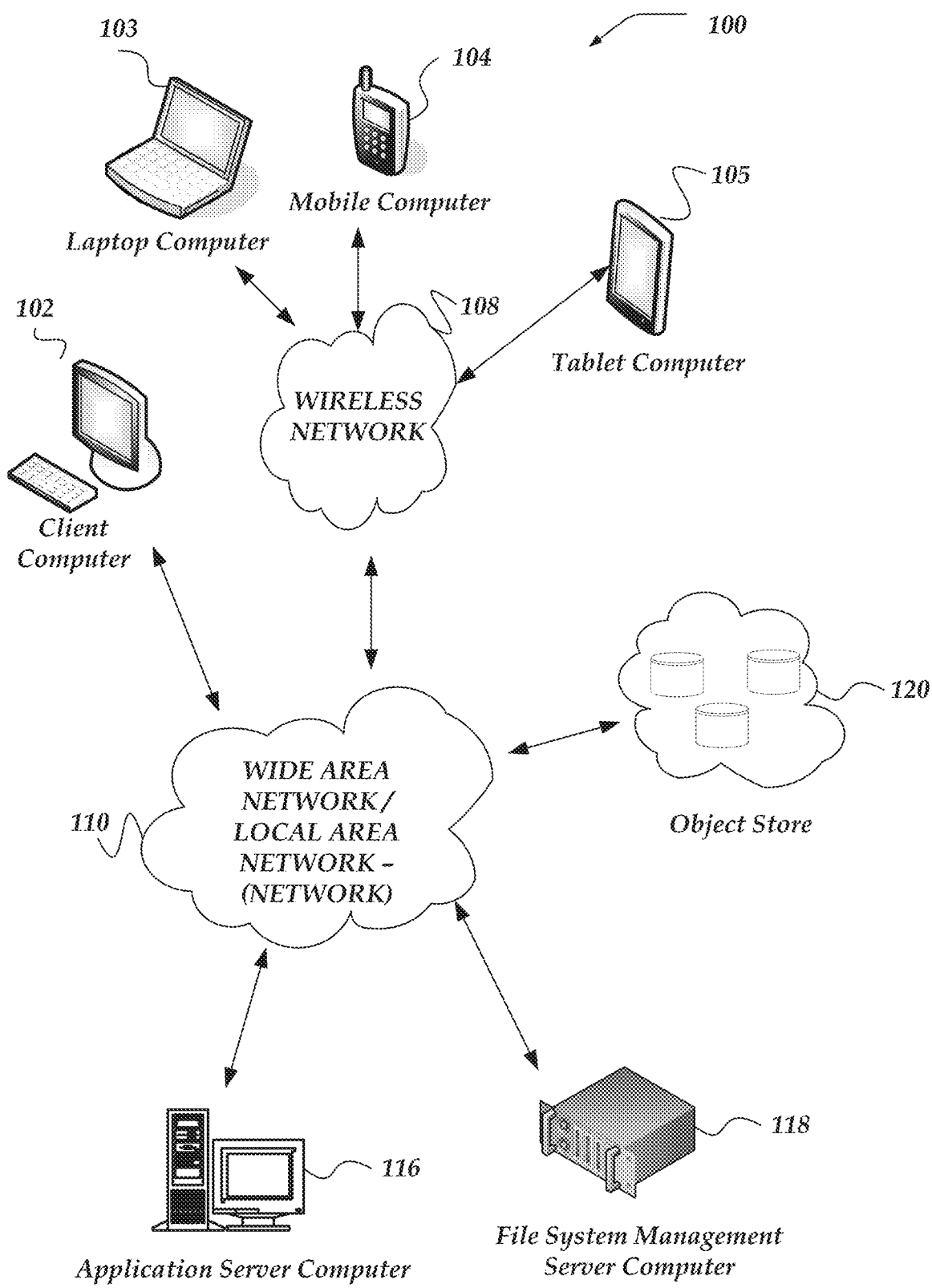
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention. In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Go, Java™, PUP, Perl, JavaScript, Ruby, Rust, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the terms "file path," "file system path," or "hierarchical file system path," and so on refer to file system information that corresponds to the logical or physical locations of file system objects within file systems. File system clients may employ file system paths to refer to specific file system objects within a file system. For example, file paths may include fields or values that correspond to the hierarchy of directories in the file system that correspond to the location of the file system object. In some cases, the name or label of the file may be considered path of the file system path. Also, often file system paths may be human readable.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the term "object store" refers to a data store that may be arranged to store data using data chunks or data blobs that may be referred to as object store objects. Each object store object may be associated with an object key that may be used to identify or index the object store objects. Clients of object stores may be enabled to access or otherwise administer objects based on their corresponding object key. In some cases, object stores may be provided by off-premises cloud computing providers. In other cases, an object store may be on-premises or otherwise local or private to an organization. Object stores or object store providers may provide various APIs or interfaces that enable users, clients, external services, or the like, to perform various actions, including, creating object store objects, updating object store objects, deleting object store objects, validating object store objects, or moving object store objects. Also, in some cases, object stores enable associating other meta-data in addition to object keys with stored objects.

As used herein the term "object store object" refers to a blob or chunk of data stored and indexed in an object store. object store objects may be referenced or accessed using one or more APIs or interfaces provided by the containing object store. In some cases, object stores may associate a key value with each stored object. The key value may be employed to identify or access individual objects in object stores.

As used herein, the terms "object store bucket," or "bucket" refer named locations in an object store for storing object store objects. Object store may provide or provision one or more buckets for clients of the object store for storing their objects. Object store may provide one or more APIs for obtaining information about a given bucket or the object it may contain.

As used herein the terms "file" or "document" refer to file system objects that may be objects that may include one or more blocks that represent one combined file. The term document may be used to distinguish file system objects that are files from file system objects that may represent directories, folders, blocks, or the like. Documents have one or more content blocks that store the data comprising the document. Herein, documents may represent files that store compressed or uncompressed data, such as, text, binary data, media (e.g., video files, music files, images, sound files, or the like), application documents (e.g., word processing files, databases, programs, libraries, or the like), structured documents, or the like. Herein documents may be considered to be stored in a file system rather than an object store. Documents may be considered to have associated file system paths or other file system meta-data that may be irrelevant or unavailable on object stores.

As used herein the term "integration relationship" refers to data structures that define relationships between one or more target file system or one or more source object stores. Object stores that are configured to provide objects for storage on the file system, may be referred to as target object stores. Likewise, file systems that are configured to receive objects from object stores may considered target file systems. Integration relationships may define a relationship between a target directory on the file system with a storage location in a source bucket in an object store. Accordingly, in some cases, for brevity and clarity directories on target file systems may be referred to as target directories and buckets in source object stores may be referred to as source buckets.

As used herein the term "import job" refers to one or more actions executed by a file system engine to copy one or more objects from a bucket (e.g., source bucket) in a source object store to a directory (e.g., target directory) in a target file system.

As used herein the term "configuration information" refers to information that may include rule-based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system that includes a plurality of directories may be provided.

In one or more of the various embodiments, a source bucket on a cloud computing environment may be determined such that the source bucket may be an object store that contains a plurality of objects.

In one or more of the various embodiments, the source bucket may be associated with a target directory in the file system based on an integration relationship such that the integration relationship includes one or more of an identity of the source bucket, or the path to the target directory.

In one or more of the various embodiments, one or more filter rules may be determined based on the integration relationship.

In one or more of the various embodiments, one or more object keys from the object store may be provided based on a query and the one or more filter rules such that each object key corresponds to an object in the source bucket that conforms to the one or more filter rules.

In one or more of the various embodiments, one or more source objects in the source bucket may be determined based on the one or more object keys such that each source object corresponds to one of the one or more object keys.

In one or more of the various embodiments, one or more target files that correspond to the one or more source objects may be determined based on the integration relationship.

In one or more of the various embodiments, in response to determining one or more changed target files or one or more changed source objects, copying the one or more source objects that correspond to the one or more changed source objects or the one or more changed target files to the target directory.

In one or more of the various embodiments, one or more object profiles may be determined based on the one or more objects such that each object profile may correspond to a source object in the source bucket and a target file in the target directory and such that each object profile may include one or more characteristics associated with the source object and the target file.

In one or more of the various embodiments, copying the one or more source objects to the target directory may include: generating an import job based on the integration relationship; determining one or more portions of the one or more object keys, wherein the one or more portions are provided by the cloud computing environment based on a query; generating one or more worker jobs that are enabled to copy the one or more source objects to the target directory; associating each worker job to a portion of the one or more object keys; executing each worker job to copy a portion of the one or more source objects to the target directory; or the like.

In one or more of the various embodiments, determining the one or more object keys from the object store may be based on the one or more filter rules may include: providing the one or more filter rules to the cloud computing environment such that the one or more filter rules include a filter rule to match a defined string pattern; determining one or more matched source objects that may be associated with a label that is matched by the filter rule; determining the one or more object keys based on a correspondence of the one or more object keys and the one or more matched source objects; or the like.

In one or more of the various embodiments, in response to copying each of the one or more source objects that correspond to one or more of the one or more changed source objects or the one or more changed target files to the target directory, executing the query with the one or more filters to determine one or more additional object keys. And, in some embodiments, in response to determining the one or more additional object keys further additional actions may be performed, including: determining one or more additional source objects in the source bucket based on the one or more additional object keys; determining one or more additional target files that may correspond to the one or more additional source objects based on the integration relationship; in response to determining one or more changed additional target files or one or more changed additional source objects, copying the one or more additional source objects that correspond to the one or more additional changed source objects or the one or more additional changed target files to the target directory; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, object store 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, object store 120, or other computers.

Client computers 102-105 may further be configured to include a client application that enables an end-user to log into an end-user account that may be managed by another computer, such as application server computer 116, file system management server computer 118, object store 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, object store 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, object store 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud computing environments. Accordingly, these innovations and embodiments are not to be construed as being limited to a single environment, and other configurations, and other architectures are also envisaged.

Further, object stores, such as, object store 120 may represent one or more data storage facilities that may be arranged to store data using individual chunks or blobs that may be associated with an object key. Clients, such as, client computers 102-105, application server computers, such as, application server computer 116, or file system management server computers, such as, file system management server computer 118, may be enabled to access or otherwise administer objects in object store 120. In some cases, object stores may be provided by off-premises cloud computing providers. In other cases, object stores may be on-premises or otherwise local or private to an organization.

Illustrative Client Computer

Figure 2:
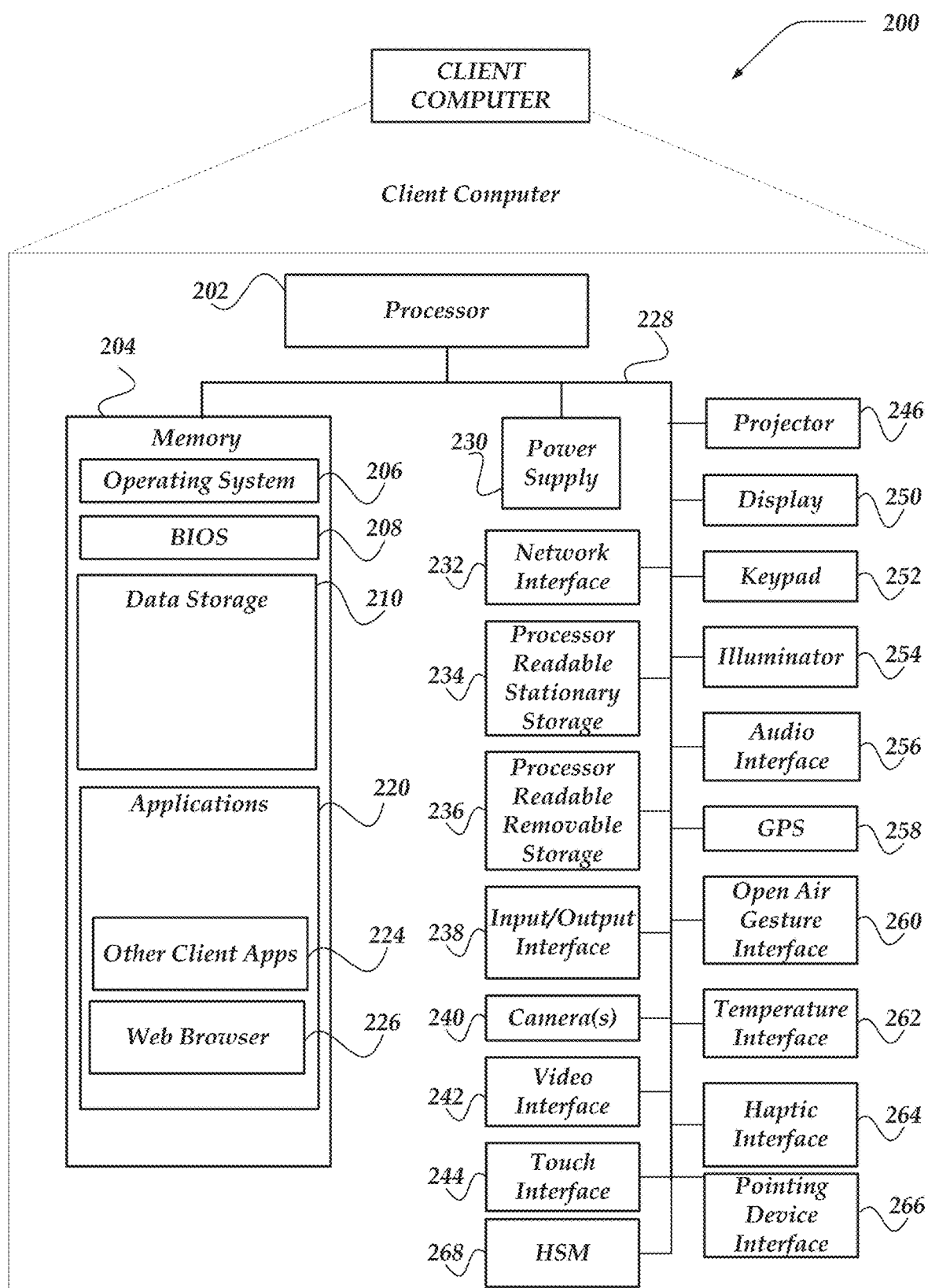
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System on a Chip (SOC), or the like.

Illustrative Network Computer

Figure 3:
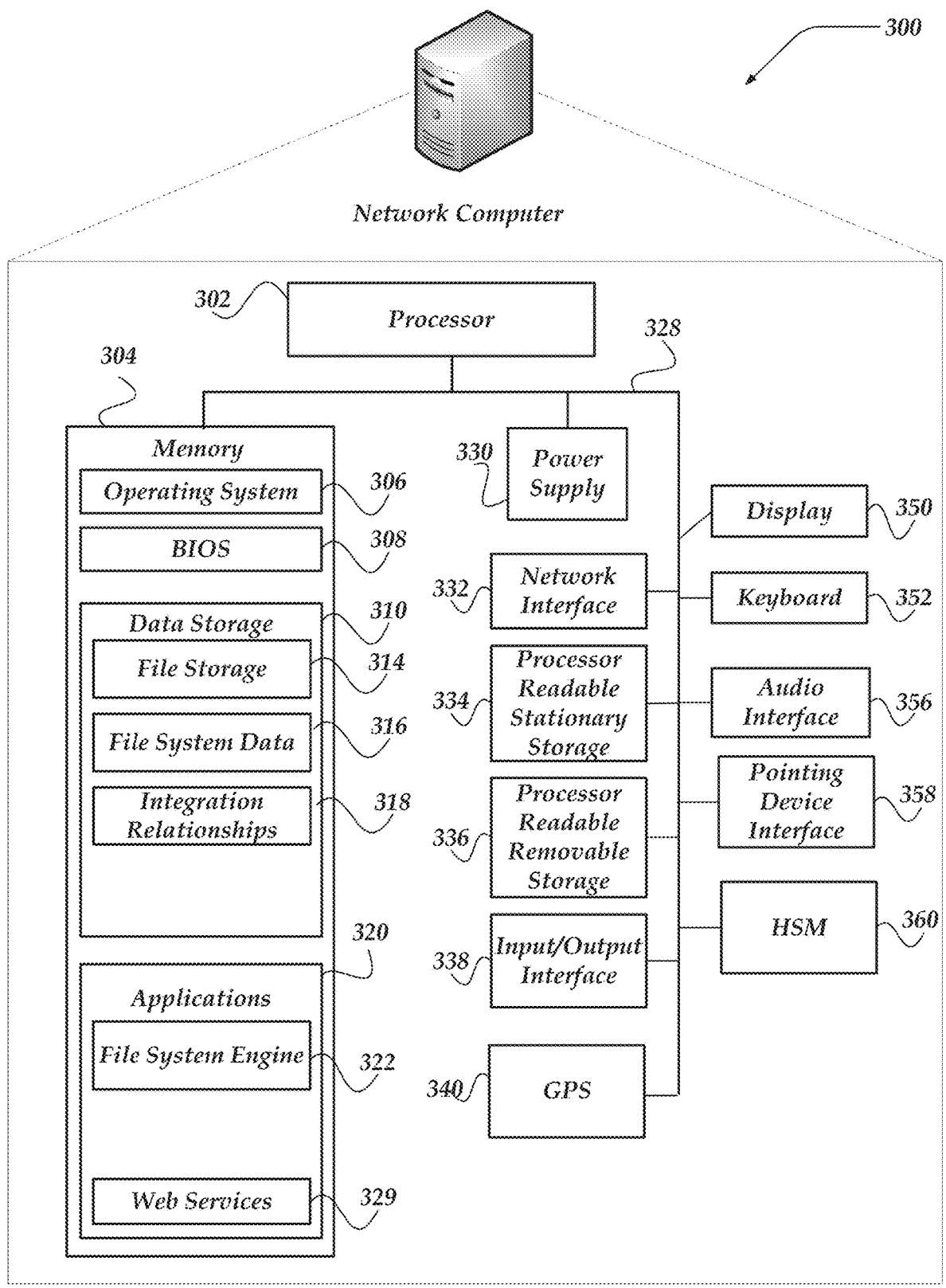
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, integration relationships 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the file system platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System on a Chip (SOC), or the like.

Illustrative Logical System Architecture

Figure 4:
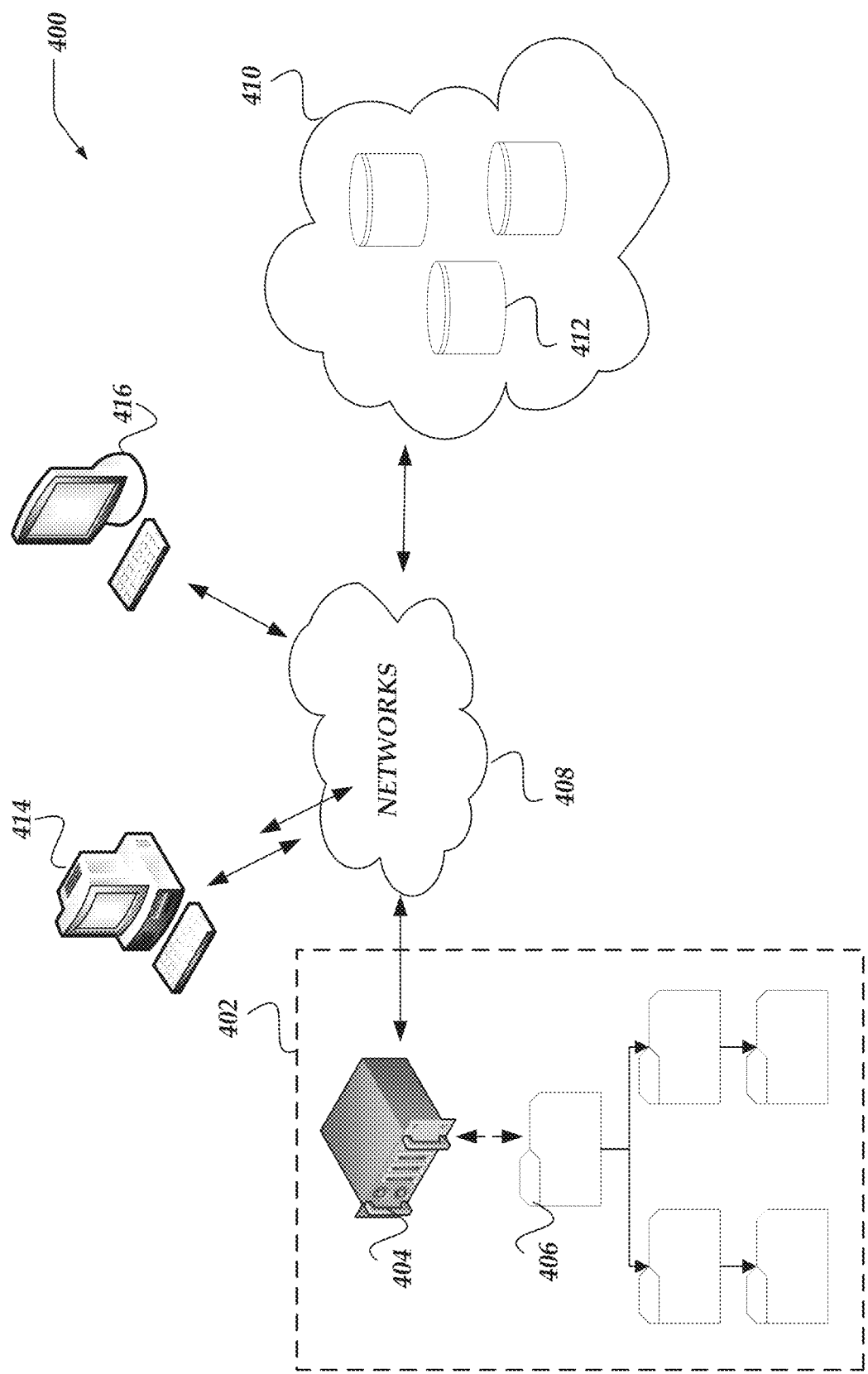
FIG. 4 illustrates a logical architecture of a system for integrating distributed file systems with object stores in accordance with one or more of the various embodiments.

FIG. 4 illustrates a logical architecture of system 400 for integrating distributed file system with object stores in accordance with one or more of the various embodiments. In one or more of the various embodiments, one or more file systems, such as, file system 402 and one or more object stores, such as, object store 410 may be arranged to be communicatively coupled to one or more networks, such as, networks 408. Accordingly, in one or more of the various embodiments, one or more clients, such as, client computer 414 or client computer 416 may be arranged to access file system 402 or object store 410 over networks 408. In some embodiments, clients of file system 402 or object store 410 may include users, services, programs, computers, devices, or the like, that may be enabled to perform one or more data related operations, such as, creating, reading, updating, or deleting data (e.g., file system objects, documents, or object store objects) that may be stored in file system 402 or object store 410.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or entities that may be stored in file system 402. In some embodiments, file system objects may include, files, documents, directories, folders, backups, snapshots, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines may be arranged to mimic the interface or behavior of one or more conventional file systems.

Also, while file system 402 is illustrated as using one file system management computer with one set of file system objects, these innovations are not so limited. Innovations herein contemplate file systems that include one or more file system management computers or one or more file system object data stores. In some embodiments, file system objects may be located remotely from one or more file system management computers. Also, a logical file system object store or file system may be spread across two or more cloud computing environments, storage clusters, or the like. In such embodiments, a file system may be distributed across a cluster of two or more storage nodes. In some embodiments, a file system management computer may be separate from the storage nodes. Also, in some embodiments, the file system management computer may be one of the storage nodes that has been selected or elected to act as the file system management computer for the cluster.

In some embodiments, one or more file system engines, such as, file system engine 322 may be running on a file system management computer, such as, file system management computer 404. In some embodiments, file system engines may be arranged to one or more perform actions for integrating distributed file systems with object stores by replicating one or more objects in object stores to one or more portions of one or more file systems.

Figure 5:
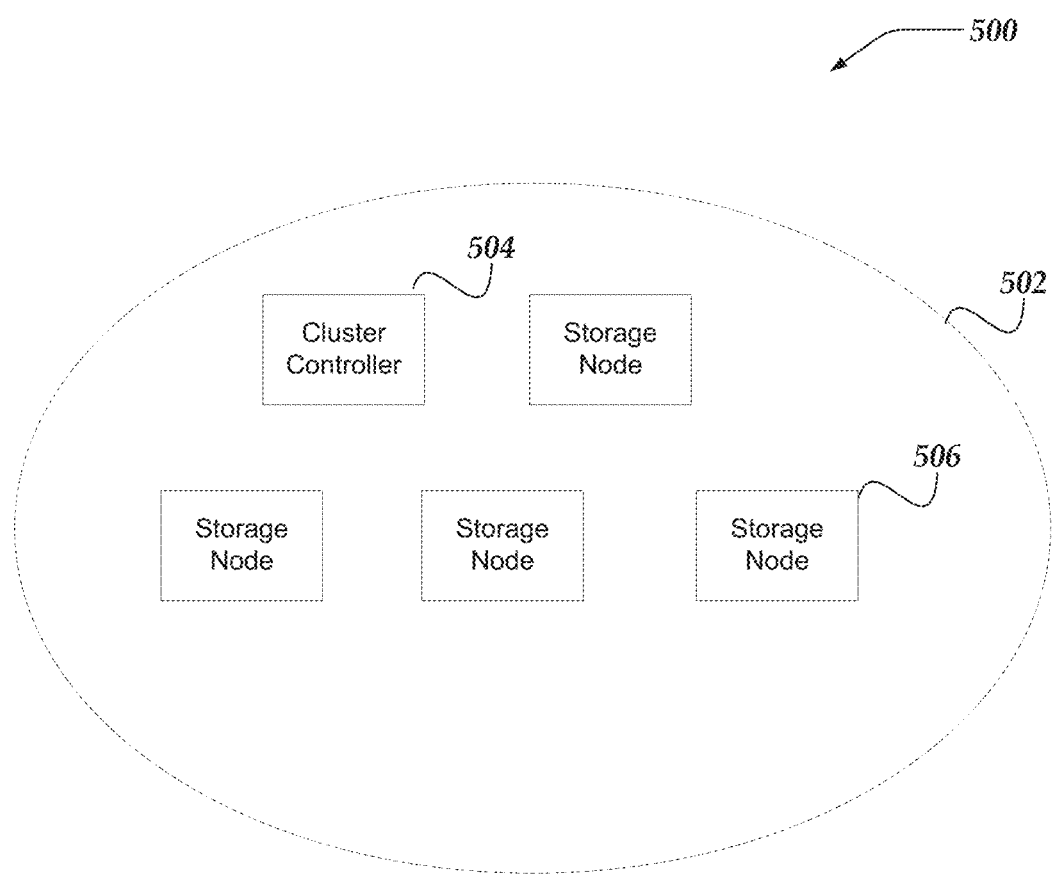
FIG. 5 illustrates a logical schematic of a file system in a cloud-computing environment for integrating distributed file systems with object stores in accordance with one or more of the various embodiments.

FIG. 5 illustrates a logical schematic of file system 500 in a cloud-computing environment for integrating distributed file systems with object stores in accordance with one or more of the various embodiments. As introduced above, file systems may be hosted or implemented in a cloud computing environment, such as, cloud computing environment 500.

In one or more of the various embodiments, cluster 502 may be virtualized file system cluster hosted in cloud computing environment 500. In this example, the boundary of cluster 502 is illustrated using a dashed line to represent the dynamic or elastic nature of a cloud-hosted file system cluster. Accordingly, in some embodiments, the innovations disclosed herein anticipate various conventional cloud computing features, such as, programmatically/dynamically provisioning components, such as, compute instances, storage volumes, or the like. Also, in some embodiments, innovations may rely on other programmatic/dynamic features often provided by cloud computing environments, such as, network configuration, grouping or association of various cloud environment components with other components, component/object tagging systems, component/object labeling, or the like.

Figure 6:
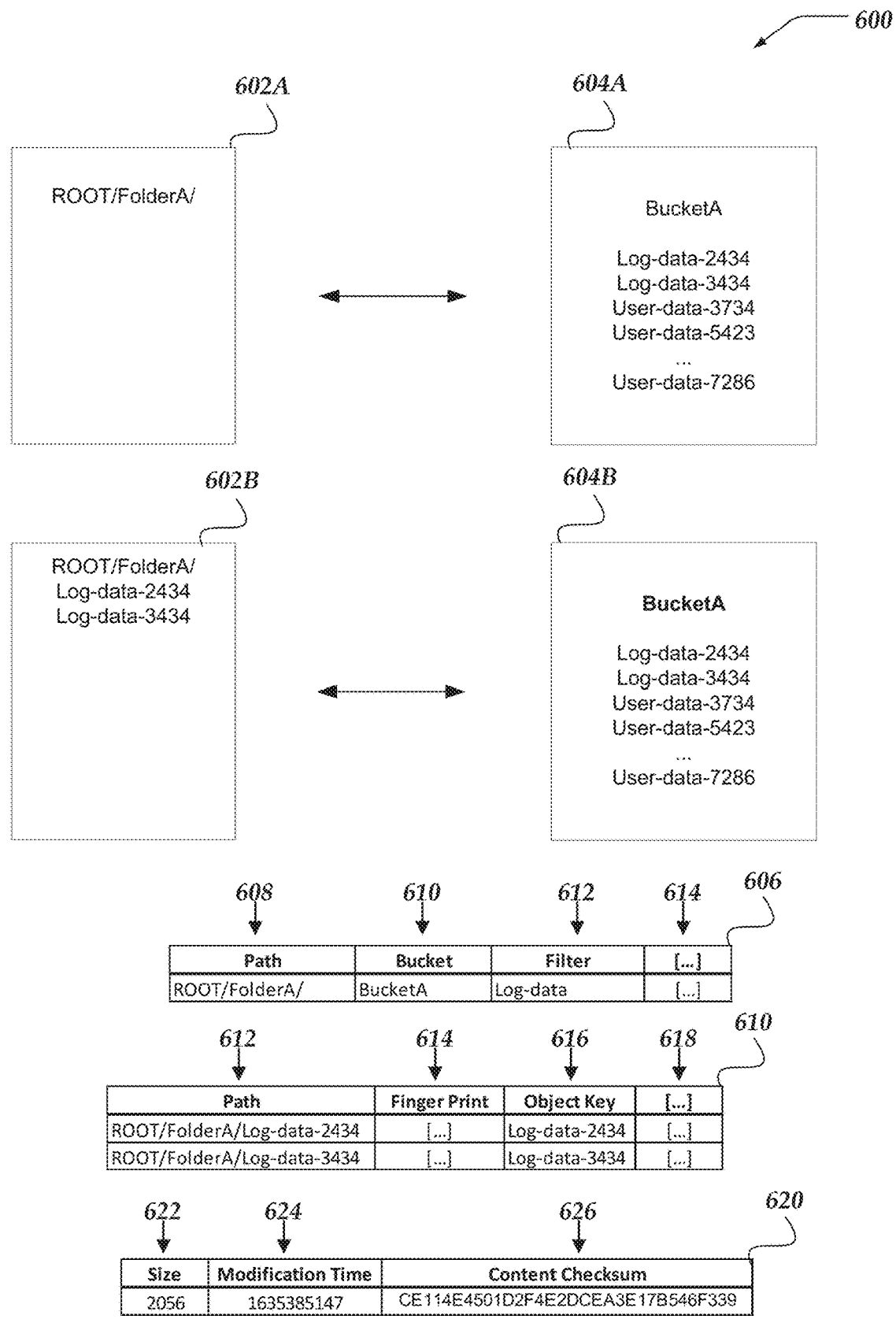
FIG. 6 illustrates a logical schematic of a system for integrating distributed file systems with object stores in accordance with one or more of the various embodiments.

FIG. 6 illustrates a logical schematic of system 600 for integrating distributed file systems with object stores in accordance with one or more of the various embodiments. In one or more of the various embodiments, file system engines may be arranged to copy one or more object store object from an object store bucket to a directory on a file system.

In some embodiments, file system engines may be arranged to enable users to configure one or more integration relationships that map a directory of a file system with an object store bucket. Accordingly, in some embodiments, file system engines may be arranged to import one or more objects from the object store to the file system based on the integration relationships. For brevity and clarity, the file system directory configured to store the imported objects may be considered a target directory in a target file system. Similarly, the bucket on the object store that contains the objects being imported may be considered a source bucket. In some embodiments, for some embodiments may be arranged to enable users to trigger an import operation. For example, in some embodiments, file system engines may be arranged to provide one or more user interfaces that enable users to configure integration relationships or initiate import operations that may be based on integration relationships.

In one or more of the various embodiments, file system engines may be arranged to query cloud object stores to determine the object keys associated with objects that may be stored in a bucket. In some embodiments, integration relationships may be configured to include one or more filters that may be applied to determine one or more objects to exclude or include in the import operation.

In one or more of the various embodiments, file system engines may be arranged to generate and maintain an index of the objects imported for each integration relationship. In some embodiments, this index may be comprised of data structures (e.g., tables, or the like) that include records for each imported object. In some embodiments, these records may include: the file system paths of the file that corresponds to the imported objects; a fingerprint information for each file in the index; the object key for each imported object; plus additional information; or the like.

In this example, for some embodiments, target directory 602A represents a target directory on a target file system. Also, for some embodiments, source bucket 604A represents a source bucket on an object store. In this example, target directory 602A is empty of files and source bucket 604A contains some objects. In this example, the object keys for the objects are illustrated in source bucket 604A.

In this example, for some embodiments, target directory 602B may be considered to represent the same directory as target directory 602A except it now contains two files (e.g., Log-data-2434 and Log-data-3434). Likewise, in this example, source bucket 604B may be considered to represent the same source bucket as source bucket 604A. Accordingly, in this example, target directory 602A and source bucket 604A may be considered to represent the target directory and source bucket before an import operation while target directory 602B and source bucket 604B may be considered to represent the same target directory as target directory 602A and the same source bucket as source bucket 604A after an import operation has completed.

As mentioned above, file system engines may be arranged to enable users to define one or more integration relationships, such as, integration relationship 606. In this example, for some embodiments, integration relationship 606 represents an integration relationship that associates target file system 602 (A or B) with source bucket 604 (A or B). In some embodiments, integration relationships may be comprised of various properties such as, target file system path 608, source bucket identifier 610, filter information 612, with one or more optional/additional properties represent by column 614.

Also, in this example, filter information 612 represents a prefix filter based on string pattern such that import operations for integration relationship 606 may import objects that have object keys that have a prefix of 'Log-data'.

In one or more of the various embodiments, integration relationships may be arranged to include one or more additional properties, rules, triggers, or the like, that may be stored in one or more additional properties represented here by additional properties 614.

In one or more of the various embodiments, file system engines may be arranged to generate or maintain an index of the imported objects with their corresponding files. Accordingly, in some embodiments, file system engines may be arranged to generate an index such as index 610 for tracking information associated with integration relationships. In some embodiments, file system engines may be arranged to generate a fingerprint for each file that corresponds to an imported object. In some embodiments, indexes such as index 610 may include one or more column associated with imported objects, such as: path column 612 for storing the file system path to a file that corresponds to an imported object; fingerprint column 614 for storing fingerprint information based on the file that corresponds to an imported object; object key column 616 for storing object keys corresponding to imported objects; one or more additional attributes, represented here by additional attribute column 618; or the like.

In one or more of the various embodiments, file system engines may be arranged to generate an integration index that corresponds to each integration relationship. Also, in some embodiments, file system engines may be arranged to generate a record in the integration index for each object imported from a source bucket. Accordingly, in some embodiments, file system engines may be arranged to employ index 610 to determine which object in the cloud store corresponds to files listed in the index.

In one or more of the various embodiments, file system engines may be arranged to generate fingerprint information for a file based on one or more properties of the file, including meta-data, version information, checksums, hash digests, hash keys, or the like. Accordingly, in one or more of the various embodiments, file system engines may be arranged to employ fingerprint information to evaluate if a previously imported object should be re-imported for a subsequent import job.

In this example, for some embodiments, fingerprint 620 represents fingerprint information for a file that corresponds to an imported object. Accordingly, in this example, fingerprint 620 may include various fields, such as, size field 622, modification time field 624, and content checksum field 626.

Generalized Operations

FIGS. 7-10 represent generalized operations for integrating distributed file systems with object stores in accordance with one or more of the various embodiments. In one or more of the various embodiments, processes 700, 800, 900, and 1000 described in conjunction with FIGS. 7-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may perform actions for integrating distributed file systems with object stores in accordance with at least one of the various embodiments or architectures such as those described in conjunction with FIGS. 4-6. Further, in one or more of the various embodiments, some or all of the actions performed by processes 700, 800, 900, and 1000 may be executed in part by file system engine 322, or the like.

Figure 7:
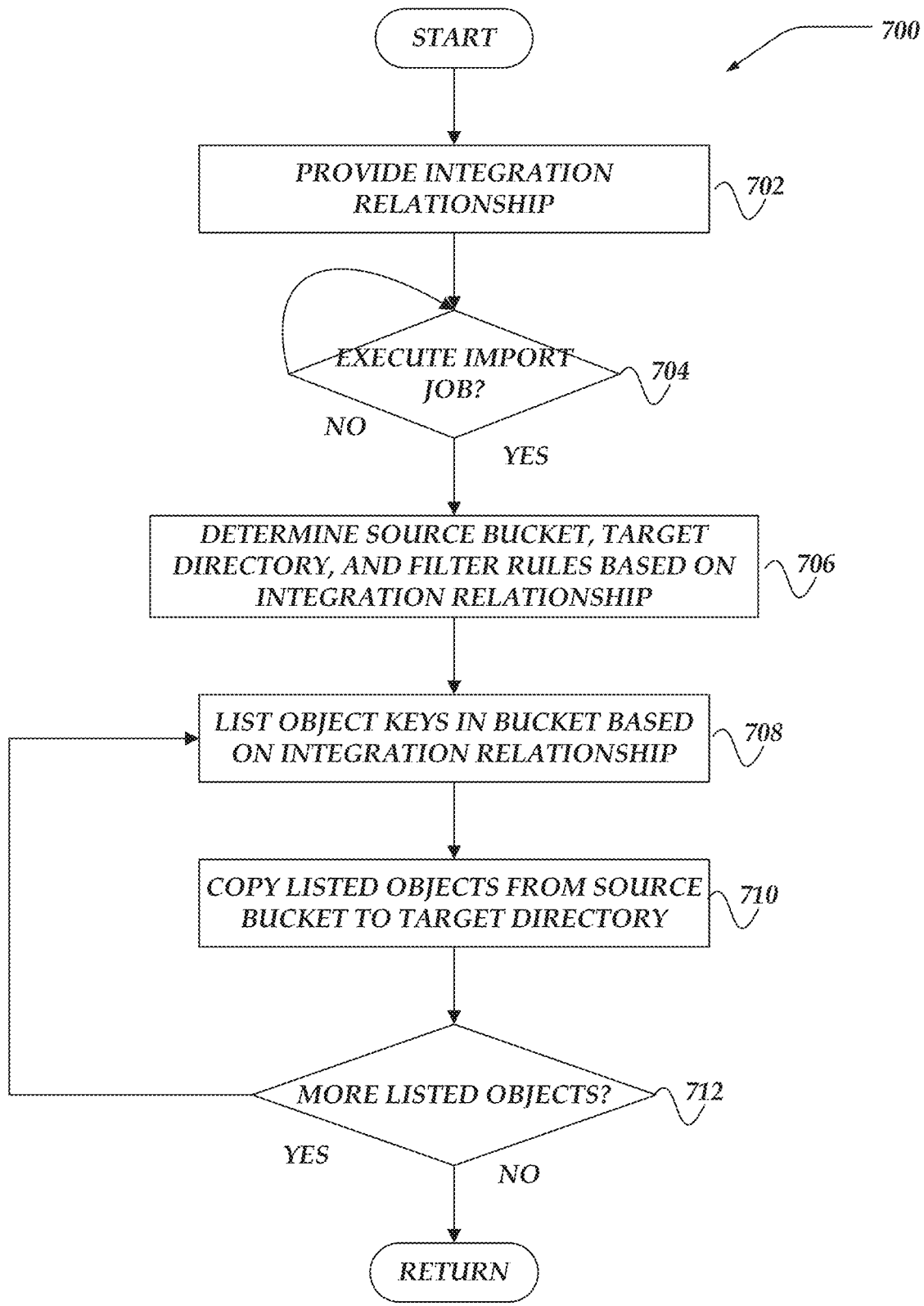
FIG. 7 illustrates an overview flowchart for a process for integrating distributed file systems with object stores in accordance with one or more of the various embodiments.

FIG. 7 illustrates an overview flowchart for process 700 for integrating distributed file systems with object stores in accordance with one or more of the various embodiments. After a start block, at block 702, in one or more of the various embodiments, one or more integration relationships may be provided to a file system engine. In one or more of the various embodiments, one or more integration relationships that declare source buckets, target directories, filter rules, or the like, may be provided to file system engines.

At decision block 704, in one or more of the various embodiments, if an import job may be executed, control may flow to block 706; otherwise, control loop back to decision block 704.

In one or more of the various embodiments, file system engines may be arranged to provide one or more user interfaces that enable authorized file system administrators (users) to initiate import jobs based on the one or more integration relationships.

Likewise, in some embodiments, file system engines or one or more third party facilities may enable users to generate scripts, programs, instructions, or the like, that may automatically trigger import jobs based on one or more conditions or circumstances. In some embodiments, file system engines may be arranged to determine some or all of such scripts, programs, instructions, or the like, from configuration information to account for local requirements or local circumstances.

At block 706, in one or more of the various embodiments, the file system engine may be arranged to determine one or more source buckets, one or more target directories, one or more filter rules, or the like, based on the one or more integration relationships. In one or more of the various embodiments, each import job may be associated with an integration relationship that declares the source bucket, target bucket, filter rules, or the like, for an import job. In some embodiments, integration relationships may be associated with other information required for performing the import job, such as, object store security/access credentials, or the like.

At block 708, in one or more of the various embodiments, the file system engine may be arranged to list one or more object keys that may be associated with one or more objects that may be contained in the one or more source buckets based on the one or more integration relationships.

In one or more of the various embodiments, file system engines may be arranged to employ one or more object store APIs to identify or list the object keys corresponding to objects included in the source bucket. The particular API may vary depending on the cloud computing environment that may be hosting the object store. Also, in some cases, one or more characteristics of the source bucket may determine the APIs or one or more parameters for APIs. For example, source buckets that may be configured to encrypt its contained object may require specific security credentials to decrypt to the objects or object keys. Accordingly, in some embodiments, the extra/additional information or specific API information may be declared in the integration relationships. Also, in some embodiments, At block 710, in one or more of the various embodiments, the file system engine may be arranged to copy the one or more listed objects from the source bucket to the target directory.

At decision block 712, in one or more of the various embodiments, if there may be one or more list objects, control may loop back to block 706; otherwise, control may be returned to a calling process.

Figure 8:
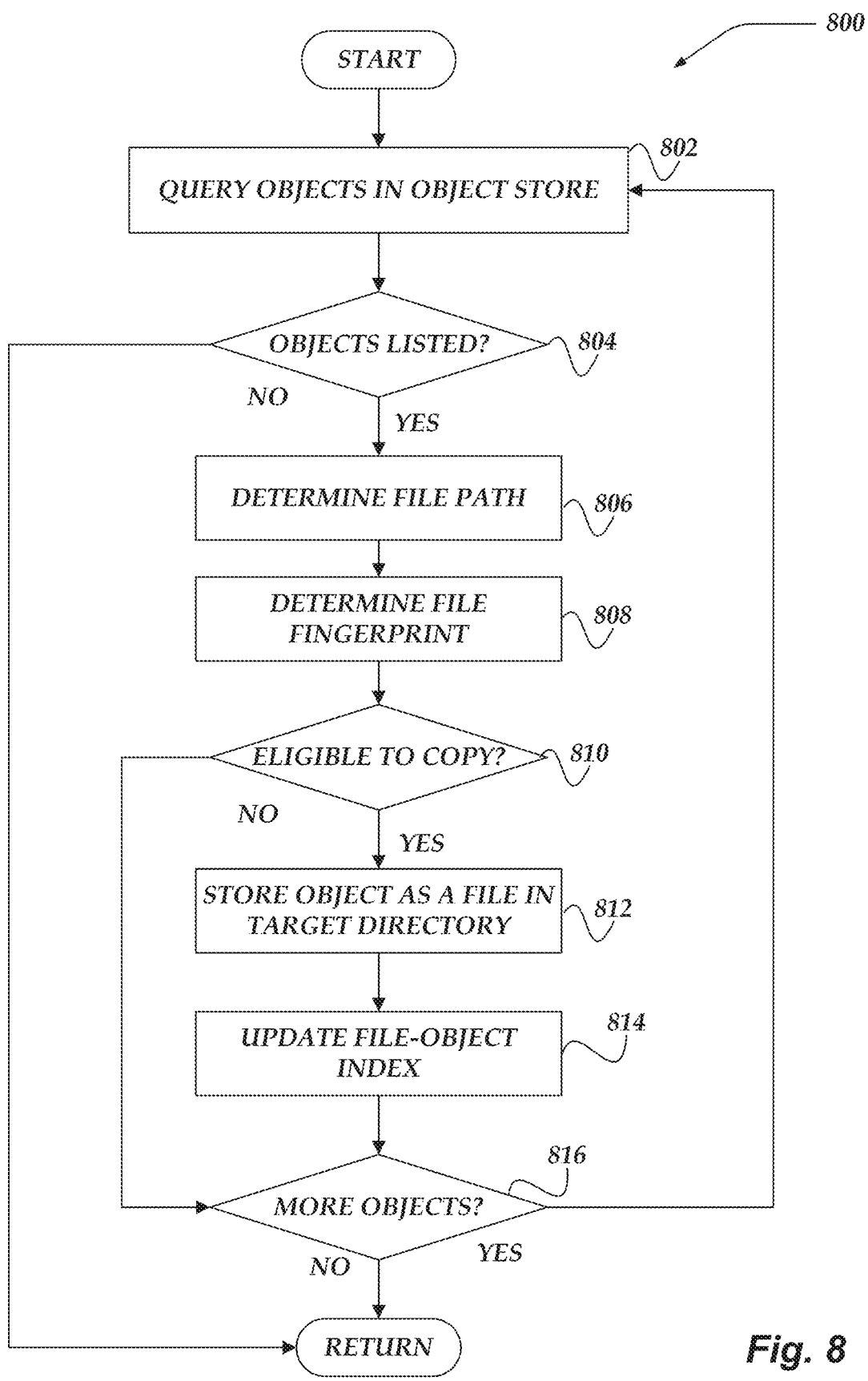
FIG. 8 illustrates a flowchart for a process for integrating distributed file systems with object stores in accordance with one or more of the various embodiments.

FIG. 8 illustrates a flowchart for process 800 for integrating distributed file systems with object stores in accordance with one or more of the various embodiments. After a start block, at block 802, in one or more of the various embodiments, file system engines may be arranged to query an object store to determine the objects that may be stored in a source bucket.

As mentioned above, file system engines may be arranged to employ integration relationships to determine source buckets that may provide objects for importing in the file system.

Accordingly, in some embodiments, file system engines may be arranged to employ one or more APIs provided by the object store (or the cloud computing environment that provided that object stores) to determine one or more object keys that correspond to one or more objects in the target bucket store.

In some cases, object store buckets may be enabled to store many objects. Accordingly, in some cases, object store APIs may include facilities that automatically enforce result pagination by returning a portion of the results per execution of the API for obtaining the object keys for objects in a bucket.

Further, in some embodiments, file system engines may be arranged to apply one or more filters included as part of integration relationships that may determine which object keys may be responsive the query. In some embodiments, filters may include 'prefix' filters that are defined using string patterns. Accordingly, in some cases, the object store may return object keys that have that match the prefix filter. Thus, in some cases, for some embodiments, a query may return an empty result if there are no objects in the source bucket or if none of the objects in the source bucket match the filters associated with the integration relationship associated with the import job.

In one or more of the various embodiments, file system engines may be arranged to execute some or all of the one or more filters on a list object of keys provided to from the object store. For example, if an object key query API of the cloud computing environment hosting the object store does not provide native support for filters (or for particular types of filters), file system engines may be arranged to perform the filtering locally by discarding results that do match the filter conditions that may be associated with the integration relationship.

In one or more of the various embodiments, file system engines may be arranged to employ rules, libraries, header files, plug-ins, instructions, or the like, provided via configuration information to determine the specific API calls or API parameters that may be required for submitting object key queries to object stores. Thus, in some embodiments, file system engines may be adaptable to local requirements or local circumstances.

At decision block 804, in one or more of the various embodiments, if one or more objects may be listed, control may flow to block 806; otherwise, control may be returned to a calling process. In some embodiments, object stores may be provided a list of object keys that may be responsive to query. As mentioned above, the object keys correspond to some or all of the objects stored in a source bucket declared in a integration relationship.

In some cases, a source bucket may be empty (containing no objects) or the filters associated with the query may exclude all contained objects from being listed in the result.

Also, in some embodiments, if the query result requires pagination, an empty result may indicate that all of the object keys have be previously provided.

Note, pagination implementation may vary depending on the cloud computing environment or the object store APIs. Accordingly, in some embodiments, file system engines may be arranged to support more than one pagination mechanism that may be selected or determined based on configuration information to account for local requirements or local circumstances.

At block 806, in one or more of the various embodiments, file system engines may be arranged to determine one or more file system paths associated with the one or more objects.

As mentioned above, import jobs may be based on integration relationships. In some embodiments, the integration relationships, among other things, may declare the target directory in the file system and source bucket in the object store. Accordingly, in some embodiments, file system engines may be arranged to determine the target directory for storing the imported objects based on the integration relationship.

In one or more of the various embodiments, file system engines may be arranged to determine the file system path for storing the imported objects based on the path to the target directory and the object key. For example, for some embodiments, if the target directory is 'ROOT/FolderA' and an object key is 'Log-data-2434', the file system engine may be arranged to generate a file path of 'ROOT/FolderA/Log-data-2434' representing a path and filename of a file that may correspond to the imported object.

In one or more of the various embodiments, file system engines may be arranged to append or prepend one or more values to a file path or filename corresponding to imported object. For example, for some embodiments, a file system engine may be configured append a file extension to a filename based on type of data included in an object store. For example, file system engines may be configured to append the '.txt' extension to a filename depending on rules or instructions that may be provided by integration relationship or other configuration information.

At block 808, in one or more of the various embodiments, file system engines may be arranged to determine a fingerprint for the imported objects.

Accordingly, in some embodiments, the file system engines may be arranged to query the file-object index associated with the integration relationship to determine a fingerprint for the file that corresponds to the incoming object if there may be one available.

At decision block 810, in one or more of the various embodiments, if one or more objects may be eligible for importing to the file system, control may flow to block 812; otherwise, control may flow to decision block 816.

In some embodiments, if the object has been previously imported from the same bucket to the same target directory, there may be an entry in the file-object index that corresponds to the incoming objects. In contrast, in some embodiments, if the object is new to the target directory or the source bucket, the file-object index for the integration relationship may not have an entry that corresponds to the incoming objects.

In one or more of the various embodiments, file system engines may be arranged to determine an incoming object as eligible for importing. In some embodiments, incoming objects that do not have a corresponding record in the relevant file-object index may be eligible for importing. Likewise, in some embodiments, if the file in the target directory or the object from the source bucket have been modified since the previous import, the object may be considered eligible for importing.

At block 812, in one or more of the various embodiments, file system engines may be arranged to store the one or more objects as a file in the target directory. In one or more of the various embodiments, eligible objects may be submitted to the file system for storage as a file in the target directory. In some embodiments, standard file system APIs may be employed to store the objects to the file system.

In one or more of the various embodiments, file system engines may be arranged to provide the object key to one or more object store APIs to retrieve the object and store it in the file system.

At block 814, in one or more of the various embodiments, file system engines may be arranged to update the file-object index based on the one or more imported objects.

As mentioned above, import jobs may be based on integration relationships that declare the source bucket, target directory, filter conditions, or the like. Accordingly, in some embodiments, file system engines may be arranged to generate or maintain file-object indexes for each integration relationship.

Thus, in some embodiments, if an object is imported, the file system engine may be arranged to generate a record or update an existing record in a file-object index that corresponds to the integration relationship driving the import job.

Accordingly, in some embodiments, file system engines may be arranged to generate an updated fingerprint and update or create a record that corresponds to the file generated by the import of the object.

In one or more of the various embodiments, generating a fingerprint may include determining a size of the file, a version information, and a checksum based on the content of the file. In some embodiments, version information may include modification times, serial numbers, sequence numbers, or the like.

At decision block 816, in one or more of the various embodiments, if there may be more objects to copy, control may loop back to block 802; otherwise, control may be returned to a calling process.

As mentioned, in some cases, object stores may provide paginated lists of object keys. Thus, in some embodiments, if the current page of listed object keys is exhausted, the file system engine may loop back to retrieve remaining pages of listed object keys from the object store. If there are no more pages or if the list object keys fit into one page of results, the import job may be complete. For example, in some embodiments, file system engines may be arranged to continue executing queries for an import job until the query returns no objects.

Figure 9:
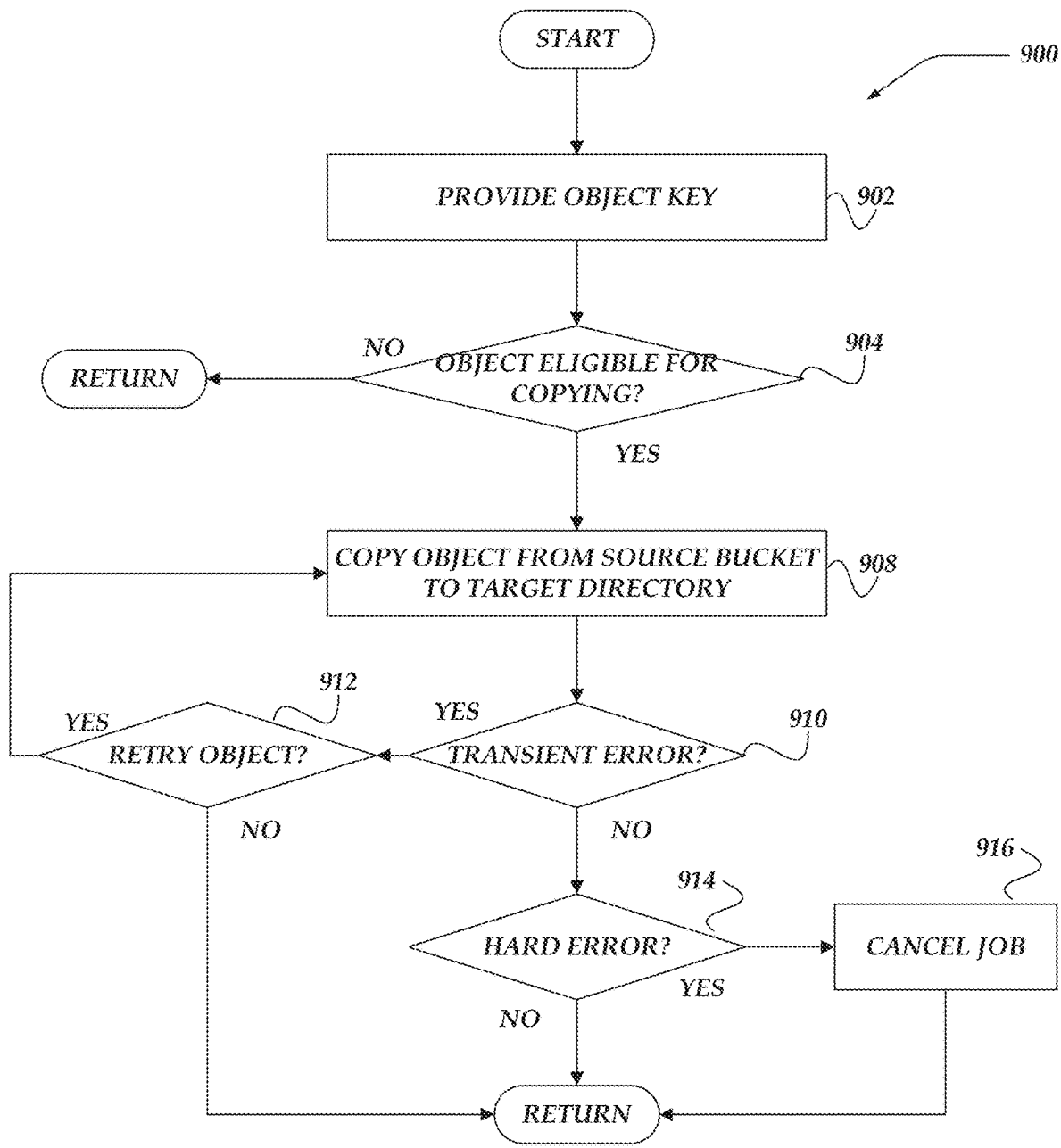
FIG. 9 illustrates a flowchart for a process for integrating distributed file systems with object stores in accordance with one or more of the various embodiments.

FIG. 9 illustrates a flowchart for process 900 for integrating distributed file systems with object stores in accordance with one or more of the various embodiments. After a start block, at block 902, in one or more of the various embodiments, an object key that corresponds to an object in a source bucket may be provided. As described above, file system engines may be arranged to determine in the object may be eligible for copying to a target directory on a file system as per an integration relationship.

At decision block 904, in one or more of the various embodiments, if the object is eligible for copying to the target directory, control may flow to block 906; otherwise, control may be returned to a calling process.

At block 908, in one or more of the various embodiments, file system engines may be arranged to copy the object the target directory.

As described above, the file system engines may be arranged to perform one or more actions to copy the object to the target directory on the file system. Further, as mentioned, file system engines may be arranged to determine a file system path corresponding to the resultant file, a file fingerprint that corresponds to the resultant file, or the like. Accordingly, in one or more of the various embodiments, file system engines may be arranged to update a file-object index that corresponds to the integration relationship.

At decision block 910, in one or more of the various embodiments, if there may be a transient error, control may flow to decision block 912; otherwise, control may flow to decision block 914.

In one or more of the various embodiments, object stores may generate one or more errors as objects during the import operation. In some cases, the errors may be related to expected or unexpected temporary disruptions or delays. For some embodiments, these types of errors may be considered transient in that the conditions that may trigger the error may be expected to be short-term or otherwise self-correcting such that retrying the copy operation may be merited. For example, in some embodiments, errors related to issues, such as, network connection problems, delays/timeouts, or the like, may be considered transient because the object store or file system may recover from the error or the conditions associated with the transient error may otherwise be automatically resolved.

In one or more of the various embodiments, error messages may be associated with various attributes or features, such as, error codes, error numbers, response codes, labels, descriptions, severity scores, priority scores, or the like. Accordingly, in some embodiments, file system engines may be arranged to employ these types of attributes to determine if an error may be a transient error. Thus, in some embodiments, file system engines may be arranged to employ maps, dictionary, patterns, rules, instructions, or the like, provided via configuration information to determine if an error message may be associated with a transient error.

At decision block 912, in one or more of the various embodiments, if the copying the object may be retried, control may flow to block 908; otherwise, control may be returned to a calling process.

In one or more of the various embodiments, file system engines may be arranged to retry the copying of objects disrupted by transient errors. However, in some embodiments, file system engines may be arranged to maintain a count of the number of transient errors that may occur for a single object or an import job. Accordingly, in some embodiments, if the error counts exceed one or more threshold values, file system engines may be arranged to perform additional actions, including canceling copying of the object or canceling or pausing the import job.

Also, in some embodiments, values representing the counts of observed transient errors may be maintained separately for different types of transient errors, or the like.

At decision block 914, in one or more of the various embodiments, if a hard error occurs, control may flow to block 916; otherwise, control may be returned to a calling process.

In one or more of the various embodiments, one or more error messages associated with copying the object to the target directory may be considered hard errors (non-transient errors) such that encountering such errors requires the import job to be paused, suspended, or canceled.

In one or more of the various embodiments, hard errors may include variety of errors associated with copying objects to the target directory. In one or more of the various embodiments, hard errors may be errors that may be considered errors that may not benefit from automatic retries. Likewise, in some embodiments, one or more hard errors may be considered too important or otherwise too noteworthy to continue the import job.

Similar to transient errors, in one or more of the various embodiments, error messages may be associated with various attributes or features, such as, error codes, error numbers, response codes, labels, descriptions, severity scores, priority scores, or the like. Accordingly, in some embodiments, file system engines may be arranged to employ these attributes to determine if an error may be a hard error. Thus, in some embodiments, file system engines may be arranged to employ maps, dictionary, patterns, rules, instructions, or the like, provided via configuration information to determine if an error message may be associated with a hard error.

At block 916, in one or more of the various embodiments, file system engines may be arranged to cancel the pending import job.

In one or more of the various embodiments, file system engines may be arranged to cancel, pause, or suspend file system engines that generate hard errors. In some embodiments, file system engines may be arranged to generate one or more notification or reports that may be bring attention to the errors that result in the canceling or copying of the object or canceling the import job.

Next, in one or more of the various embodiments, control may be returned to a calling process.

Figure 10:
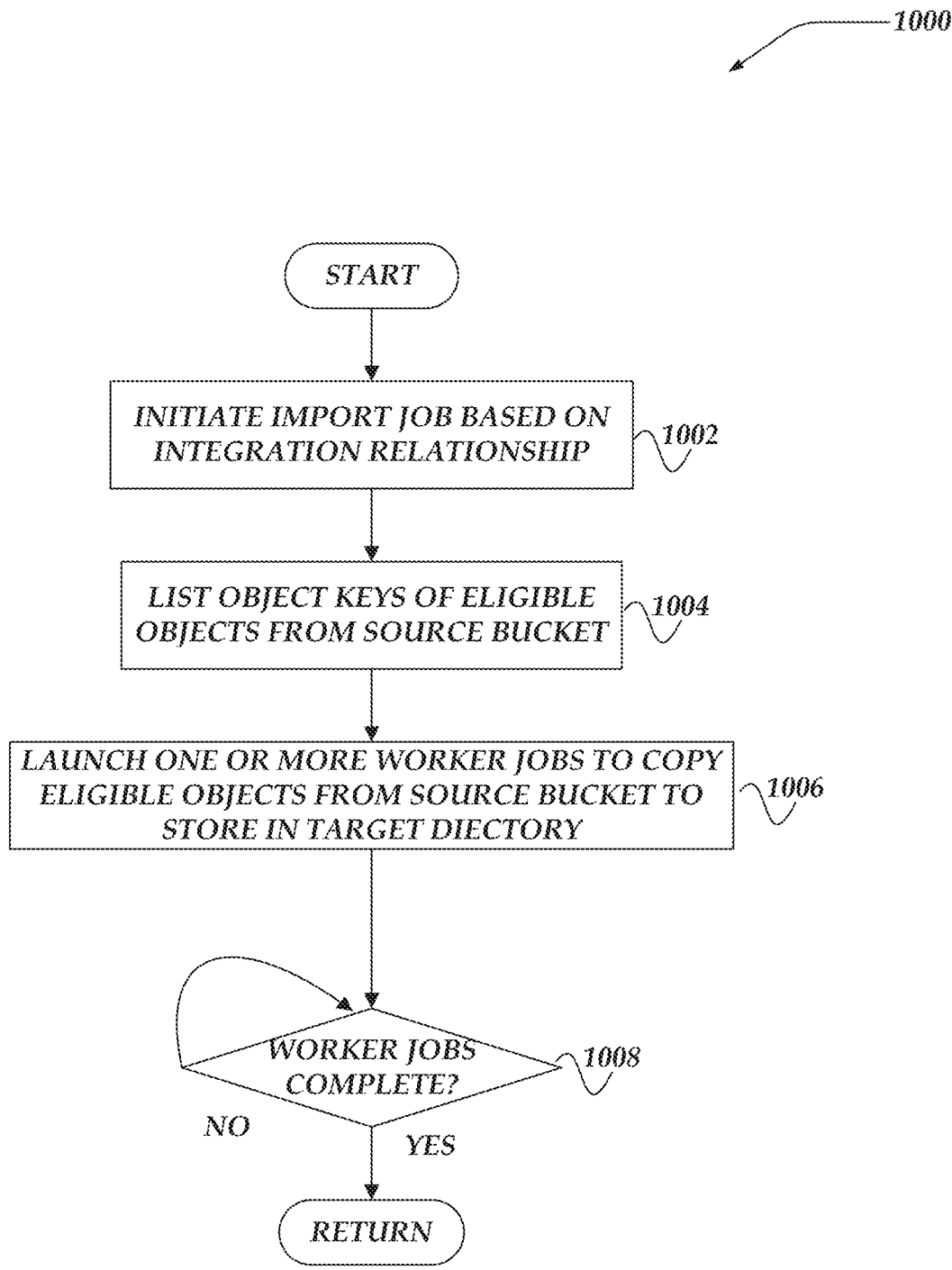
FIG. 10 illustrates a flowchart for a process for integrating distributed file systems with object stores in accordance with one or more of the various embodiments.

FIG. 10 illustrates a flowchart for process 1000 for integrating distributed file systems with object stores in accordance with one or more of the various embodiments. After a start block, at block 1002, in one or more of the various embodiments, file system engines may be arranged to initiate an import job based on an integration relationship. As described above, one or more integration relationships may be provided to the file system engine. Integration relationships may declare mappings between target directories and source buckets as well as additional information, including filters, or the like, used for determining eligible object keys.

Accordingly, in some embodiments, import jobs may be executed based on the declarations included in integration relationships. In some embodiments, file system engines may be arranged to provide one or more user interfaces that enable users to initiate import jobs based on the one or more integration relationships. In some embodiments, file system engines may be arranged to enable import jobs to be triggered based on rules, instructions, third-party integrations, or the like.

At block 1004, in one or more of the various embodiments, file system engines may be arranged to list object keys of eligible objects from a source bucket.

In one or more of the various embodiments, eligible objects may be objects in the source bucket that meet the filtering criteria of the integration relationship. Also, in some embodiments, eligible objects may include: new objects that do not have a corresponding file in the target directory copied by a prior import job; objects that have been modified since they were last imported; and objects corresponding to files in the target directory that have been modified in the file system since they were last imported.

At block 1006, in one or more of the various embodiments, file system engines may be arranged to launch one or more worker jobs to copy eligible objects from the source bucket to store in the target directory. In one or more of the various embodiments, file system engines may be provided a list of eligible object keys that each correspond to an object stored in the source bucket.

Accordingly, in one or more of the various embodiments, file system engines may be arranged to spawn one or more worker jobs. In some embodiments, worker jobs may be processes executed on one or more computers, such as, storage nodes, cloud compute instances, file system management server computers, or the like.

In some embodiments, file system engines may be configured launch a worker job for each eligible object. Also, in one or more of the various embodiments, file system engines may be configured allocate two or more objects per worker job. In some embodiments, file system engines may be arranged enable the number of worker jobs to be limited based on one or more utilization metrics. Accordingly, in some embodiments, if the file system is being heavily utilized, some import jobs may be prioritized in favor of other file system activities. Also, in some embodiments, file system engines may be arranged to assign priorities to import jobs directly or declare a priority value in one or more integration relationships.

In one or more of the various embodiments, each worker job may be arranged to copy its assigned object(s) from the source bucket to the target directory.

At decision block 1008, in one or more of the various embodiments, if the worker jobs are not completed, control may loop back to decision block 1008; otherwise, control may be returned to a calling process.

In one or more of the various embodiments, file system engines may be arranged to monitor execution of the import job and the worker jobs. In some embodiments, if all the worker jobs finish copying their assigned objects to the target directory the import job may be considered complete.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System on a Chip (SOC), or the like.

What is claimed as new and desired to be protected by Letters Patent of the United States is:

1. A method for managing data in a file system over a network using one or more processors that execute instructions to perform actions, comprising:
    providing a file system that includes a plurality of directories;
    determining a source bucket on a cloud computing environment, wherein the source bucket is an object store that contains a plurality of objects;
    associating the source bucket with a target directory in the file system based on an integration relationship, wherein the integration relationship includes one or more of an identity of the source bucket, or the path to the target directory;
    determining one or more filter rules to access the source bucket or the target directory based on the identity of the source bucket or the path to the target directory included in the integration relationship;
    providing one or more object keys from the object store based on a query and the one or more filter rules, wherein each object key corresponds to an object in the source bucket that conforms to the one or more filter rules;
    determining one or more source objects in the source bucket based on the one or more object keys, wherein each source object corresponds to one of the one or more object keys;
    determining one or more target files that correspond to the one or more source objects based on the integration relationship; and
    in response to determining one or more changed target files or one or more changed source objects, copying the one or more source objects that correspond to the one or more changed source objects or the one or more changed target files to the target directory.

2. The method of claim 1, further comprising:
    determining one or more object profiles based on the one or more objects, wherein each object profile corresponds to a source object in the source bucket and a target file in the target directory, and wherein each object profile includes one or more characteristics associated with the source object and the target file.

3. The method of claim 1, wherein copying the one or more source objects to the target directory, further comprises:
    generating an import job based on the integration relationship;
    determining one or more portions of the one or more object keys, wherein the one or more portions are provided by the cloud computing environment based on a query;
    generating one or more worker jobs that are enabled to copy the one or more source objects to the target directory;
    associating each worker job to a portion of the one or more object keys; and
    executing each worker job to copy a portion of the one or more source objects to the target directory.

4. The method of claim 1, wherein determining the one or more object keys from the object store based on the one or more filter rules, further comprises:
    providing the one or more filter rules to the cloud computing environment, wherein the one or more filter rules includes a filter rule to match a defined string pattern;
    determining one or more matched source objects that are associated with a label that is matched by the filter rule; and
    determining the one or more object keys based on a correspondence of the one or more object keys and the one or more matched source objects.

5. The method of claim 1, further comprising:
    in response to copying each of the one or more source objects that correspond to one or more of the one or more changed source objects or the one or more changed target files to the target directory, executing the query with the one or more filters to determine one or more additional object keys; and
    in response to determining the one or more additional object keys, performing further additional actions, including:
        determining one or more additional source objects in the source bucket based on the one or more additional object keys;
        determining one or more additional target files that correspond to the one or more additional source objects based on the integration relationship; and
        in response to determining one or more changed additional target files or one or more changed additional source objects, copying the one or more additional source objects that correspond to the one or more additional changed source objects or the one or more additional changed target files to the target directory.

6. A network computer for managing data in a file system, comprising:
    a memory that stores at least instructions; and
    one or more processors that execute instructions that perform actions, including:
        providing a file system that includes a plurality of directories;
        determining a source bucket on a cloud computing environment, wherein the source bucket is an object store that contains a plurality of objects;
        associating the source bucket with a target directory in the file system based on an integration relationship, wherein the integration relationship includes one or more of an identity of the source bucket, or the path to the target directory;
        determining one or more filter rules to access the source bucket or the target directory based on the identity of the source bucket or the path to the target directory included in the integration relationship;
        providing one or more object keys from the object store based on a query and the one or more filter rules, wherein each object key corresponds to an object in the source bucket that conforms to the one or more filter rules;
        determining one or more source objects in the source bucket based on the one or more object keys, wherein each source object corresponds to one of the one or more object keys;

determining one or more target files that correspond to the one or more source objects based on the integration relationship; and in response to determining one or more changed target files or one or more changed source objects, copying the one or more source objects that correspond to the one or more changed source objects or the one or more changed target files to the target directory.

7. The network computer of claim 6, wherein the one or more processors execute instructions that perform actions, further comprising:

determining one or more object profiles based on the one or more objects, wherein each object profile corresponds to a source object in the source bucket and a target file in the target directory, and wherein each object profile includes one or more characteristics associated with the source object and the target file.

8. The network computer of claim 6, wherein copying the one or more source objects to the target directory, further comprises:

generating an import job based on the integration relationship;

determining one or more portions of the one or more object keys, wherein the one or more portions are provided by the cloud computing environment based on a query;

generating one or more worker jobs that are enabled to copy the one or more source objects to the target directory;

associating each worker job to a portion of the one or more object keys; and executing each worker job to copy a portion of the one or more source objects to the target directory.

9. The network computer of claim 6, wherein determining the one or more object keys from the object store based on the one or more filter rules, further comprises:

providing the one or more filter rules to the cloud computing environment, wherein the one or more filter rules includes a filter rule to match a defined string pattern;

determining one or more matched source objects that are associated with a label that is matched by the filter rule; and determining the one or more object keys based on a correspondence of the one or more object keys and the one or more matched source objects.

10. The network computer of claim 6, wherein the one or more processors execute instructions that perform actions, further comprising:

in response to copying each of the one or more source objects that correspond to one or more of the one or more changed source objects or the one or more changed target files to the target directory, executing the query with the one or more filters to determine one or more additional object keys; and in response to determining the one or more additional object keys, performing further additional actions, including:

determining one or more additional source objects in the source bucket based on the one or more additional object keys;

determining one or more additional target files that correspond to the one or more additional source objects based on the integration relationship; and in response to determining one or more changed additional target files or one or more changed additional source objects, copying the one or more additional source objects that correspond to the one or more additional changed source objects or the one or more additional changed target files to the target directory.

11. A processor readable non-transitory storage media that includes instructions for managing data in a file system over a network, wherein execution of the instructions by one or more processors on one or more network computers performs actions, comprising:

providing a file system that includes a plurality of directories;

determining a source bucket on a cloud computing environment, wherein the source bucket is an object store that contains a plurality of objects;

associating the source bucket with a target directory in the file system based on an integration relationship, wherein the integration relationship includes one or more of an identity of the source bucket, or the path to the target directory;

determining one or more filter rules to access the source bucket or the target directory based on the identity of the source bucket or the path to the target directory included in the integration relationship;

providing one or more object keys from the object store based on a query and the one or more filter rules, wherein each object key corresponds to an object in the source bucket that conforms to the one or more filter rules;

determining one or more source objects in the source bucket based on the one or more object keys, wherein each source object corresponds to one of the one or more object keys;

determining one or more target files that correspond to the one or more source objects based on the integration relationship; and in response to determining one or more changed target files or one or more changed source objects, copying the one or more source objects that correspond to the one or more changed source objects or the one or more changed target files to the target directory.

12. The media of claim 11, further comprising:

determining one or more object profiles based on the one or more objects, wherein each object profile corresponds to a source object in the source bucket and a target file in the target directory, and wherein each object profile includes one or more characteristics associated with the source object and the target file.

13. The media of claim 11, wherein copying the one or more source objects to the target directory, further comprises:

generating an import job based on the integration relationship;

determining one or more portions of the one or more object keys, wherein the one or more portions are provided by the cloud computing environment based on a query;

generating one or more worker jobs that are enabled to copy the one or more source objects to the target directory;

associating each worker job to a portion of the one or more object keys; and executing each worker job to copy a portion of the one or more source objects to the target directory.

14. The media of claim 11, wherein determining the one or more object keys from the object store based on the one or more filter rules, further comprises:

providing the one or more filter rules to the cloud computing environment, wherein the one or more filter rules includes a filter rule to match a defined string pattern;

determining one or more matched source objects that are associated with a label that is matched by the filter rule; and determining the one or more object keys based on a correspondence of the one or more object keys and the one or more matched source objects.

15. The media of claim 11, further comprising:

in response to copying each of the one or more source objects that correspond to one or more of the one or more changed source objects or the one or more changed target files to the target directory, executing the query with the one or more filters to determine one or more additional object keys; and in response to determining the one or more additional object keys, performing further additional actions, including:

determining one or more additional source objects in the source bucket based on the one or more additional object keys;

determining one or more additional target files that correspond to the one or more additional source objects based on the integration relationship; and in response to determining one or more changed additional target files or one or more changed additional source objects, copying the one or more additional source objects that correspond to the one or more additional changed source objects or the one or more additional changed target files to the target directory.

16. A system for managing data in a file system comprising:

a network computer, comprising:

a memory that stores at least instructions; and one or more processors that execute instructions that perform actions, including:

providing a file system that includes a plurality of directories;

determining a source bucket on a cloud computing environment, wherein the source bucket is an object store that contains a plurality of objects;

associating the source bucket with a target directory in the file system based on an integration relationship, wherein the integration relationship includes one or more of an identity of the source bucket, or the path to the target directory;

determining one or more filter rules to access the source bucket or the target directory based on the identity of the source bucket or the path to the target directory included in the integration relationship;

providing one or more object keys from the object store based on a query and the one or more filter rules, wherein each object key corresponds to an object in the source bucket that conforms to the one or more filter rules;

determining one or more source objects in the source bucket based on the one or more object keys, wherein each source object corresponds to one of the one or more object keys;

determining one or more target files that correspond to the one or more source objects based on the integration relationship; and in response to determining one or more changed target files or one or more changed source objects, copying the one or more source objects that correspond to the one or more changed source objects or the one or more changed target files to the target directory; and a client computer, comprising:

a memory that stores at least instructions; and one or more processors that execute instructions that perform actions, including, providing one or more of the one or more integration relationships or the one or more filter rules.

17. The system of claim 16, wherein the one or more network computer processors execute instructions that perform actions, further comprising:

determining one or more object profiles based on the one or more objects, wherein each object profile corresponds to a source object in the source bucket and a target file in the target directory, and wherein each object profile includes one or more characteristics associated with the source object and the target file.

18. The system of claim 16, wherein copying the one or more source objects to the target directory, further comprises:

generating an import job based on the integration relationship;

determining one or more portions of the one or more object keys, wherein the one or more portions are provided by the cloud computing environment based on a query;

generating one or more worker jobs that are enabled to copy the one or more source objects to the target directory;

associating each worker job to a portion of the one or more object keys; and executing each worker job to copy a portion of the one or more source objects to the target directory.

19. The system of claim 16, wherein determining the one or more object keys from the object store based on the one or more filter rules, further comprises:

providing the one or more filter rules to the cloud computing environment, wherein the one or more filter rules includes a filter rule to match a defined string pattern;

determining one or more matched source objects that are associated with a label that is matched by the filter rule; and determining the one or more object keys based on a correspondence of the one or more object keys and the one or more matched source objects.

20. The system of claim 16, wherein the one or more network computer processors execute instructions that perform actions, further comprising:

in response to copying each of the one or more source objects that correspond to one or more of the one or more changed source objects or the one or more changed target files to the target directory, executing the query with the one or more filters to determine one or more additional object keys; and in response to determining the one or more additional object keys, performing further additional actions, including:

determining one or more additional source objects in the source bucket based on the one or more additional object keys;

determining one or more additional target files that correspond to the one or more additional source objects based on the integration relationship; and in response to determining one or more changed additional target files or one or more changed additional source objects, copying the one or more additional source objects that correspond to the one or more additional changed source objects or the one or more additional changed target files to the target directory.

* * * * *